US012619920B2

(12) United States Patent
Giokas

(10) Patent No.: US 12,619,920 B2
(45) Date of Patent: May 5, 2026

(54) DISTRIBUTED ADAPTIVE MACHINE LEARNING TRAINING FOR INTERACTION EXPOSURE DETECTION AND PREVENTION

(71) Applicant: Verge Capital Limited, Dublin (IE)

(72) Inventor: Ioannis Giokas, Jersey City, NJ (US)

(73) Assignee: Verge Capital Limited (IE)

( * ) Notice: Subject to any disclaimer, the term of this patent is extended or adjusted under 35 U.S.C. 154(b) by 909 days.

(21) Appl. No.: 17/877,533

(22) Filed: Jul. 29, 2022

(65) Prior Publication Data

US 2023/0031123 A1 Feb. 2, 2023

Related U.S. Application Data

(60) Provisional application No. 63/228,403, filed on Aug. 2, 2021.

(51) Int. Cl.
*G06N 20/20* (2019.01)
*G06Q 20/40* (2012.01)

(52) U.S. Cl.
CPC ......... *G06N 20/20* (2019.01); *G06Q 20/4016* (2013.01)

(58) Field of Classification Search
CPC ..................................................... G06N 20/20
See application file for complete search history.

(56) References Cited

U.S. PATENT DOCUMENTS

| | | | |
|---|---|---|---|
| 7,552,865 B2 | 6/2009 | Varadarajan et al. | |
| 7,668,769 B2 | 2/2010 | Baker et al. | |
| 8,458,069 B2 | 6/2013 | Adjaoute | |
| 10,692,058 B2 | 6/2020 | Zoldi et al. | |
| 10,937,030 B2 | 3/2021 | Allbright et al. | |
| 10,949,854 B1 | 3/2021 | Kramme et al. | |
| 11,276,023 B1 * | 3/2022 | Butler ................... | G06N 20/00 |
| 12,100,008 B2 * | 9/2024 | Pandian .................. | G06N 3/08 |
| 2003/0097330 A1 | 5/2003 | Hillmer et al. | |

(Continued)

FOREIGN PATENT DOCUMENTS

| | | |
|---|---|---|
| CN | 111105240 A | 5/2020 |
| TW | 200828168 A | 7/2008 |

*Primary Examiner* — Mohammad S Rostami
(74) *Attorney, Agent, or Firm* — Shumaker, Loop & Kendrick, LLP; Patrick B. Horne

(57) ABSTRACT

Embodiments of the present invention provide for a distributed adaptive learning transaction fraud detection and prevention system has a meta-model system that accesses a fraud meta-model comprising a real-time fraud detection and prevention engine and a transaction database comprising transaction fraud decision data and transaction fraud feedback data; receives from at least one sub-system a sub-system best performing fraud model; updates the fraud meta-model based at least in part on the sub-system best performing fraud model; and transmits the updated fraud meta-model to the at least one sub-system; and at least one sub-system receives the updated fraud meta-model transmitted from the meta-model system; accessing a sub-system fraud model comprising a real-time fraud detection and prevention engine and a transaction database comprising transaction fraud decision data and transaction fraud feedback data; and updates the sub-system fraud model with the updated fraud meta-model transmitted from the meta-model system.

18 Claims, 10 Drawing Sheets

(56) References Cited

U.S. PATENT DOCUMENTS

| | | | |
|---|---|---|---|
| 2004/0225473 | A1 | 11/2004 | Aoki et al. |
| 2009/0106151 | A1 | 4/2009 | Nelsen et al. |
| 2011/0016052 | A1 | 1/2011 | Scragg |
| 2016/0132886 | A1 | 5/2016 | Burke et al. |
| 2018/0350006 | A1 | 12/2018 | Agrawal et al. |
| 2019/0066112 | A1 | 2/2019 | Adjaoute |
| 2019/0132224 | A1* | 5/2019 | Verma .................... G06F 18/24 |
| 2019/0228415 | A1 | 7/2019 | Adjaoute |
| 2019/0295383 | A1 | 9/2019 | Chen et al. |
| 2020/0058030 | A1 | 2/2020 | Adjaoute |
| 2020/0167256 | A1* | 5/2020 | Höfig ................. G06Q 10/0635 |
| 2020/0280578 | A1* | 9/2020 | Hearty ................ H04L 63/1425 |
| 2020/0310938 | A1* | 10/2020 | Höfig .................... G06F 11/263 |
| 2020/0364718 | A1* | 11/2020 | Hindi ................. G06Q 20/4016 |
| 2021/0168161 | A1* | 6/2021 | Dunn .................... H04L 51/212 |
| 2021/0200955 | A1* | 7/2021 | Ben Kimon ......... G06N 3/0442 |
| 2021/0273961 | A1* | 9/2021 | Humphrey .......... H04L 63/1433 |
| 2022/0012741 | A1* | 1/2022 | Raj ....................... G06Q 20/405 |
| 2022/0070292 | A1* | 3/2022 | Casal ................. H04M 3/2281 |
| 2022/0094709 | A1* | 3/2022 | Sharma .............. G06F 18/2415 |
| 2022/0101192 | A1* | 3/2022 | Patel ........................ G06N 7/01 |
| 2022/0122085 | A1* | 4/2022 | Wu .................... G06Q 20/4016 |
| 2022/0253856 | A1* | 8/2022 | Wong .................... G06N 3/088 |
| 2022/0321581 | A1* | 10/2022 | Sood .................... H04L 67/133 |
| 2022/0383323 | A1* | 12/2022 | Burke .................... G06Q 20/20 |
| 2023/0007042 | A1* | 1/2023 | Haworth .............. H04L 63/205 |

* cited by examiner

Figure 3:
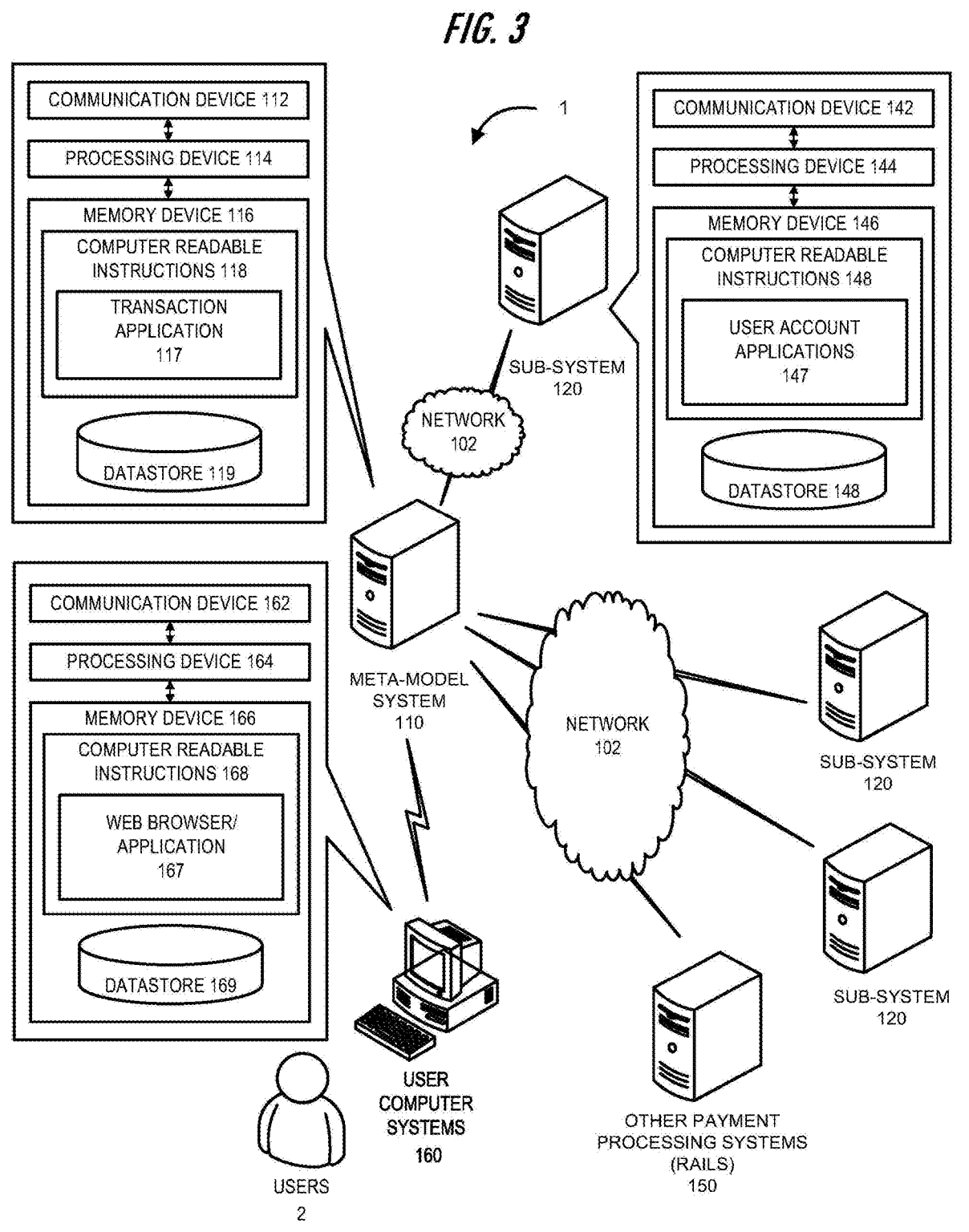

COMMUNICATION DEVICE 112

PROCESSING DEVICE 114

MEMORY DEVICE 116

COMPUTER READABLE INSTRUCTIONS 118

TRANSACTION APPLICATION 117

DATASTORE 119

COMMUNICATION DEVICE 142

PROCESSING DEVICE 144

MEMORY DEVICE 146

COMPUTER READABLE INSTRUCTIONS 148

USER ACCOUNT APPLICATIONS 147

DATASTORE 148

SUB-SYSTEM 120

NETWORK 102

COMMUNICATION DEVICE 162

PROCESSING DEVICE 164

MEMORY DEVICE 166

COMPUTER READABLE INSTRUCTIONS 168

WEB BROWSER/ APPLICATION 167

DATASTORE 169

META-MODEL SYSTEM 110

NETWORK 102

SUB-SYSTEM 120

SUB-SYSTEM 120

USER COMPUTER SYSTEMS 160

USERS 2

OTHER PAYMENT PROCESSING SYSTEMS (RAILS) 150

*FIG. 5A*

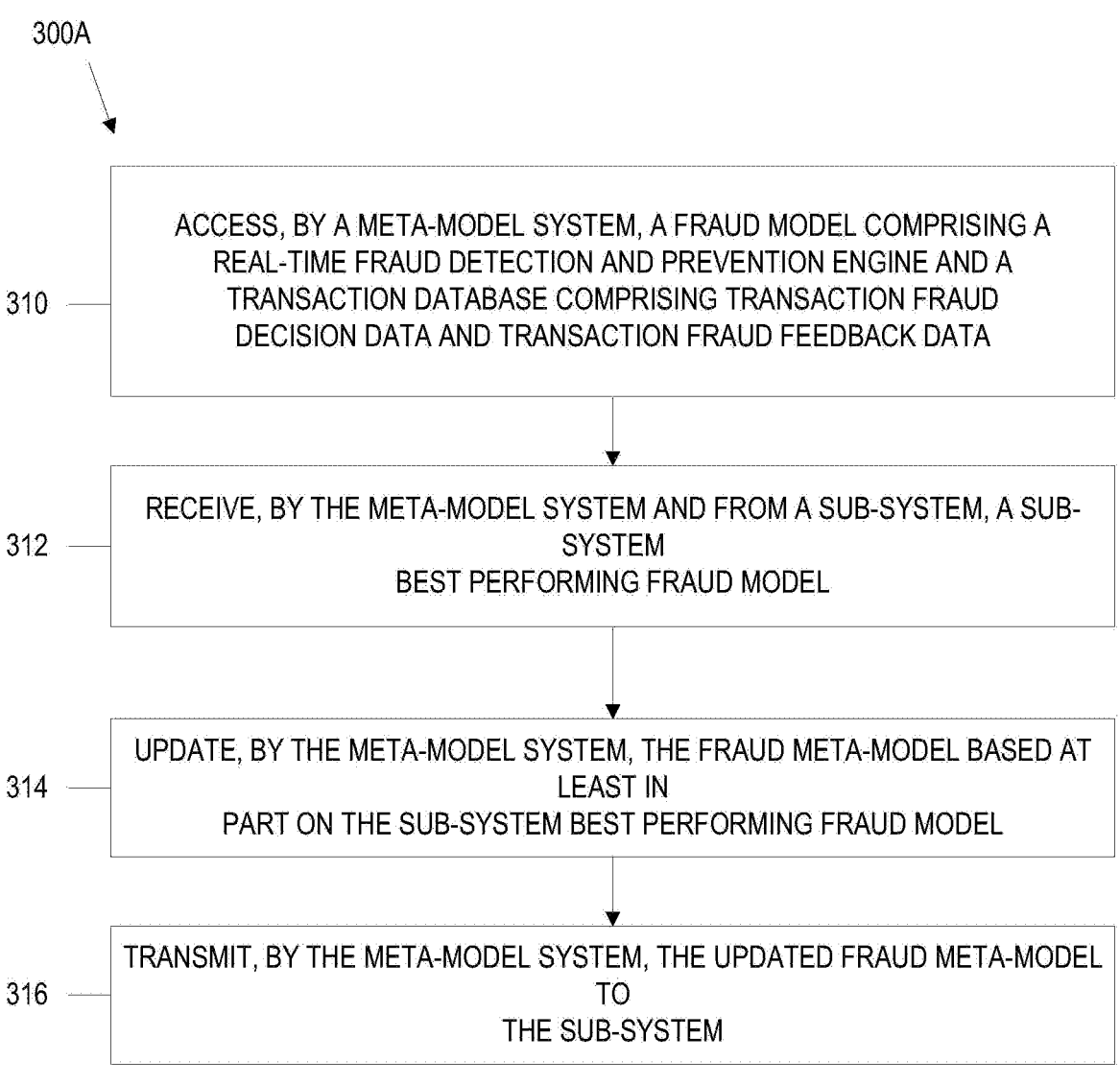

300A

310 — ACCESS, BY A META-MODEL SYSTEM, A FRAUD MODEL COMPRISING A REAL-TIME FRAUD DETECTION AND PREVENTION ENGINE AND A TRANSACTION DATABASE COMPRISING TRANSACTION FRAUD DECISION DATA AND TRANSACTION FRAUD FEEDBACK DATA

312 — RECEIVE, BY THE META-MODEL SYSTEM AND FROM A SUB-SYSTEM, A SUB-SYSTEM BEST PERFORMING FRAUD MODEL

314 — UPDATE, BY THE META-MODEL SYSTEM, THE FRAUD META-MODEL BASED AT LEAST IN PART ON THE SUB-SYSTEM BEST PERFORMING FRAUD MODEL

316 — TRANSMIT, BY THE META-MODEL SYSTEM, THE UPDATED FRAUD META-MODEL TO THE SUB-SYSTEM

*FIG. 5B*

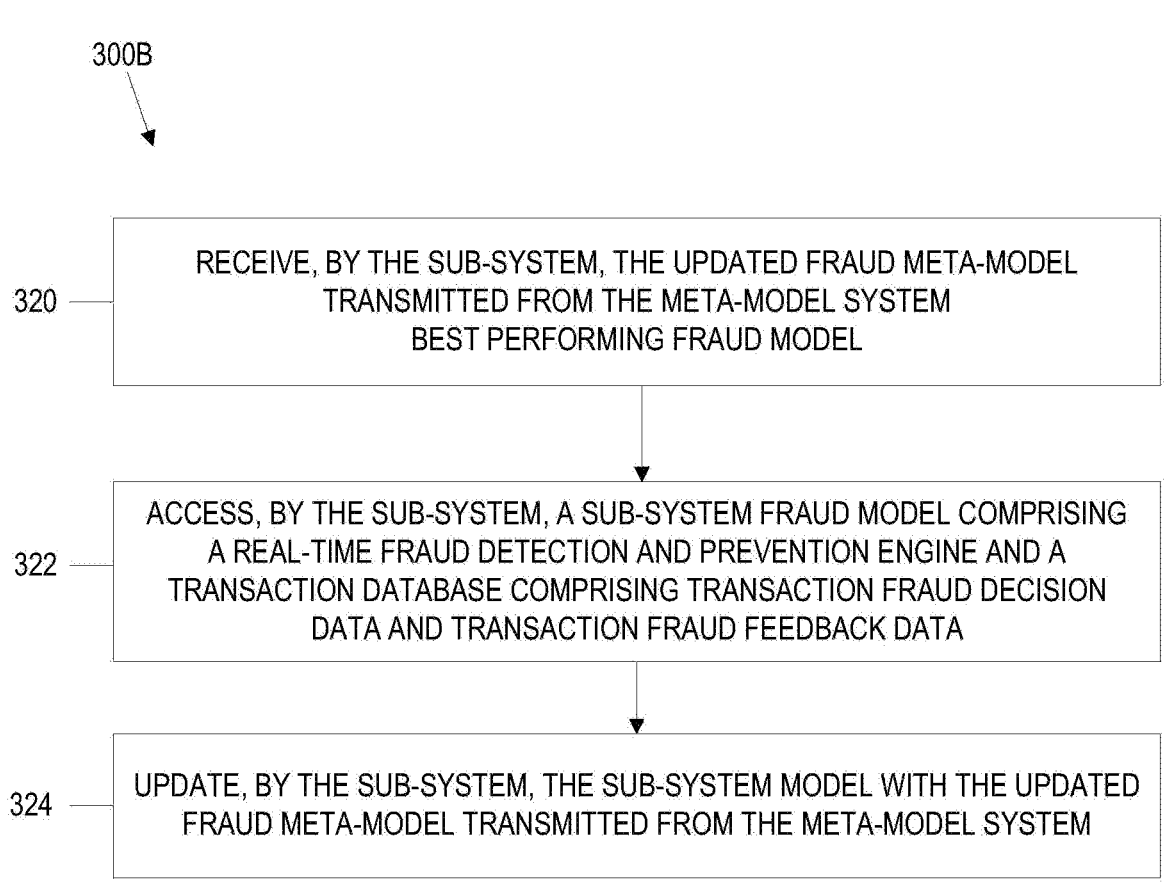

300B

320 — RECEIVE, BY THE SUB-SYSTEM, THE UPDATED FRAUD META-MODEL TRANSMITTED FROM THE META-MODEL SYSTEM BEST PERFORMING FRAUD MODEL

322 — ACCESS, BY THE SUB-SYSTEM, A SUB-SYSTEM FRAUD MODEL COMPRISING A REAL-TIME FRAUD DETECTION AND PREVENTION ENGINE AND A TRANSACTION DATABASE COMPRISING TRANSACTION FRAUD DECISION DATA AND TRANSACTION FRAUD FEEDBACK DATA

324 — UPDATE, BY THE SUB-SYSTEM, THE SUB-SYSTEM MODEL WITH THE UPDATED FRAUD META-MODEL TRANSMITTED FROM THE META-MODEL SYSTEM

FIG. 5C

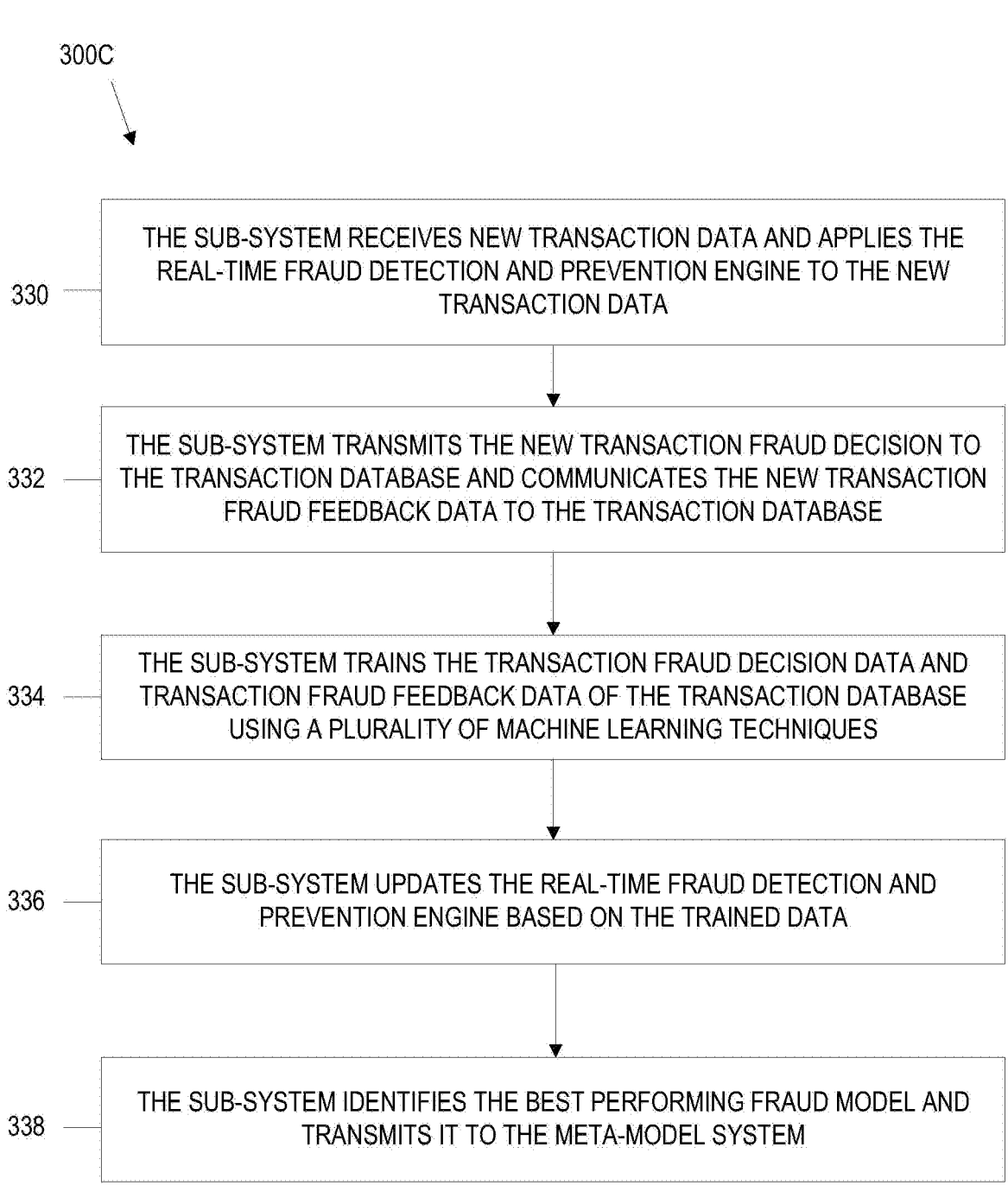

300C

330 — THE SUB-SYSTEM RECEIVES NEW TRANSACTION DATA AND APPLIES THE REAL-TIME FRAUD DETECTION AND PREVENTION ENGINE TO THE NEW TRANSACTION DATA

332 — THE SUB-SYSTEM TRANSMITS THE NEW TRANSACTION FRAUD DECISION TO THE TRANSACTION DATABASE AND COMMUNICATES THE NEW TRANSACTION FRAUD FEEDBACK DATA TO THE TRANSACTION DATABASE

334 — THE SUB-SYSTEM TRAINS THE TRANSACTION FRAUD DECISION DATA AND TRANSACTION FRAUD FEEDBACK DATA OF THE TRANSACTION DATABASE USING A PLURALITY OF MACHINE LEARNING TECHNIQUES

336 — THE SUB-SYSTEM UPDATES THE REAL-TIME FRAUD DETECTION AND PREVENTION ENGINE BASED ON THE TRAINED DATA

338 — THE SUB-SYSTEM IDENTIFIES THE BEST PERFORMING FRAUD MODEL AND TRANSMITS IT TO THE META-MODEL SYSTEM

DISTRIBUTED ADAPTIVE MACHINE LEARNING TRAINING FOR INTERACTION EXPOSURE DETECTION AND PREVENTION

CROSS-REFERENCE TO RELATED APPLICATION

This application claims the benefit of priority of U.S. provisional patent application No. 63/228,403, titled "DISTRIBUTED ADAPTIVE LEARNING TRANSACTION FRAUD DETECTION AND PREVENTION SYSTEM," filed on Aug. 2, 2021, which is incorporated herein in its entirety by this reference.

FIELD

This invention relates generally to the field of fraud detection and prevention, and more particularly embodiments of the invention relate to a distributed adaptive learning transaction fraud detection and prevention system.

BACKGROUND

Financial institutions, especially card issuers and card processors, are facing a major problem related to unauthorized card operations by fraudsters & criminals. This is further accelerated based on the changes in consumer behavior that are expanding the attack surface exponentially, like the use of multiple channels (e.g. online, mobile, phone, in-store etc.) to transact with their cards. On top of that, consumers are oversharing on social media & paying little attention to details (e.g. fraudulent sites, phishing emails etc.) & hope between networks (e.g. Wi-Fi, 3G, 4G, LTE, 5G etc.) making the life of fraud detection systems & experts very difficult.

This leads to a very challenging environment to balance between customer experience vs. costs (e.g. HR, tools, financial losses, insurance policies etc.) vs. fraud rate where financial institutions have to continuously optimize the rule-based systems so as to code each fraud scenario in an evolving landscape, which requires a lot of time, resources & expertise that is hard to get & expensive (either in the form of experts or automation tools); while in parallel such system generate a number of alerts creating noise for analysts & frustration for users. This has an impact both to the reputation and the bottom line of financial institutions since consumers do not like their transactions to be declined or being victims of fraud.

The main difficulty is the highly unbalanced data. There are various solutions for the imbalance problem such as the application of oversampling or under-sampling techniques. These techniques do not provide sufficient performances on real-world data, and the development of per financial institution model is not solving the imbalanced and skewed data problem in the long-term.

BRIEF SUMMARY

Embodiments of the present invention address the above needs and/or achieve other advantages by providing apparatuses and methods that provide a distributed adaptive learning transaction fraud detection and prevention system.

Within this context we have developed a real-time streaming card fraud detection & prevention system. A system that is continuously self-learning & fine-tuning its models; that enable it to have increased accuracy & reduced false positives. This is based on a novel approach toward machine learning model design and deployment architecture of the overall system.

Machine Learning-based methods can continuously improve the accuracy of fraud prevention solutions according to information about each cardholder's behavior. These AI solutions are suited perfectly not only for credit cards but can be implemented for e-commerce fraud detection purposes, as well as many other industries were financial transactions are involved. However, fraud detection requires a substantial amount of planning before using machine learning algorithms at it, whereas a common theme that persists is continued human supervision to make the solutions more efficient and effective. Human analysts are still needed to investigate fraudulent patterns.

Practically speaking, eliminating fraud wholly might not be possible, but our system aims to optimize the resources required to better tackle it. In fraud analysis, efficiency remains an important issue that should be focused on to achieve a high fraud detection rate. Efficiency guarantees the performance of the fraud detection models, even an increase of 1% accuracy rate is beneficial because it will have an advantageous impact in detecting fraudulent activities and fraudsters. The goal of our system is to be a fraud analytics framework that deals with the yet unsolved class imbalance problem to enhance the efficiency of the fraud analytics systems.

Embodiments of the invention a distributed adaptive learning transaction fraud detection and prevention system comprising a meta-model system comprising a memory device comprising computer readable instructions and a processing device operatively coupled with the memory device for executing the computer readable instructions to cause the processing device to access from the memory device a fraud meta-model comprising a real-time fraud detection and prevention engine and a transaction database comprising transaction fraud decision data and transaction fraud feedback data; receive from at least one sub-system a sub-system best performing fraud model; update the fraud meta-model based at least in part on the sub-system best performing fraud model; and transmit the updated fraud meta-model to the at least one sub-system.

The system also includes at least one sub-system communicatively coupled and non-collocated with the meta-model system comprising a memory device comprising computer readable instructions and a processing device operatively coupled with the memory device for executing the computer readable instructions to cause the processing device to receive the updated fraud meta-model transmitted from the meta-model system; access a sub-system fraud model comprising a real-time fraud detection and prevention engine and a transaction database comprising transaction fraud decision data and transaction fraud feedback data; and update the sub-system fraud model with the updated fraud meta-model transmitted from the meta-model system.

In some embodiments, the at least one sub-system has a processing device for executing the computer readable instructions further to cause the processing device to receive new transaction data; apply the real-time fraud detection and prevention engine to the new transaction data, thereby resulting in a new transaction fraud decision; communicate the new transaction fraud decision to the transaction database; and communicate new transaction fraud feedback data to the transaction database.

In some such embodiments, the at least one sub-system has a processing device for executing the computer readable instructions further to cause the processing device to train the transaction fraud decision data and transaction fraud feedback data of the transaction database using a plurality of machine learning techniques, thereby resulting in trained data; and update the real-time fraud detection and prevention engine based at least in part on the trained data.

In some such embodiments, the at least one sub-system has a processing device for executing the computer readable instructions further to cause the processing device to identify a best performing fraud model; and transmit the best performing fraud model to the meta-model system.

In some embodiments, using the plurality of machine learning techniques comprises ensembling a plurality of classification models, thereby resulting in a plurality of ensembling results and subsequently stacking the plurality of ensembling results in order to increase accuracy. In some such embodiments, the plurality of classification models comprises at least one selected from the group consisting of a gradient boosting model, a random forest model, an isolation forest model, an isolation forest model alongside a multi-layer neural network model, and/or an isolation forest model alongside a genetic algorithm.

According to embodiments of the invention, a method provides for distributed adaptive learning transaction fraud detection and prevention using a meta-model system comprising a memory device comprising computer readable instructions and a processing device operatively coupled with the memory device for executing the computer readable instructions to cause the processing device to perform a set of actions and a sub-system operatively coupled with the meta-model system comprising a memory device comprising computer readable instructions and a processing device operatively coupled with the memory device for executing the computer readable instructions to cause the processing device to perform a second set of actions.

The method includes accessing, by the meta-model system from the memory device, a fraud meta-model comprising a real-time fraud detection and prevention engine and a transaction database comprising transaction fraud decision data and transaction fraud feedback data; receiving, by the meta-model system and from at least one sub-system, a sub-system best performing fraud model; and updating, by the meta-model system, the fraud meta-model based at least in part on the sub-system best performing fraud model; transmitting, by the meta-model system, the updated fraud meta-model to the at least one sub-system; receiving, by the at least one sub-system, the updated fraud meta-model transmitted from the meta-model system; accessing, by the at least one sub-system, a sub-system fraud model comprising a real-time fraud detection and prevention engine and a transaction database comprising transaction fraud decision data and transaction fraud feedback data; and updating, by the at least one sub-system, the sub-system fraud model with the updated fraud meta-model transmitted from the meta-model system.

In some embodiments, the method also includes receiving, by the at least one sub-system, new transaction data; applying, by the at least one sub-system, the real-time fraud detection and prevention engine to the new transaction data, thereby resulting in a new transaction fraud decision; communicating, by the at least one sub-system, the new transaction fraud decision to the transaction database; and communicating, by the at least one sub-system, new transaction fraud feedback data to the transaction database.

In some such embodiments, the method also includes training, by the at least one sub-system, the transaction fraud decision data and transaction fraud feedback data of the transaction database using a plurality of machine learning techniques, thereby resulting in trained data; and updating, by the at least one sub-system, the real-time fraud detection and prevention engine based at least in part on the trained data. In some such embodiments, the method includes identifying, by the at least one sub-system, a best performing fraud model; and transmitting, by the at least one sub-system, the best performing fraud model to the meta-model system.

In some embodiments, using the plurality of machine learning techniques comprises ensembling a plurality of classification models, thereby resulting in a plurality of ensembling results and subsequently stacking the plurality of ensembling results in order to increase accuracy. In some such embodiments, the plurality of classification models comprises at least one selected from the group consisting of a gradient boosting model, a random forest model, an isolation forest model, an isolation forest model alongside a multi-layer neural network model, and/or an isolation forest model alongside a genetic algorithm.

In some embodiments, a method of training a machine-learning (ML) algorithm to detect and prevent exposure is provided. The algorithm can be trained by a meta-model system including a memory device including computer readable instructions, and a processing device operatively coupled with the memory device for executing the computer readable instructions to cause the processing device to access from the memory device an exposure meta-model including a real-time exposure detection and prevention engine and an interaction database comprising interaction exposure decision data and interaction exposure feedback data.

Exposure detection and prevention herein can refer to, as an example, exposure to fraud and the prevention thereof, for example by a financial institution or other entity that offers, for example, credit cards, debit cards, ATM services, retail payment services, online payment services, or other financial transaction implementations and services.

Executing the computer readable instructions can further cause the processing device to: receive from at least one sub-system a sub-system best performing exposure model; update the exposure meta-model based at least in part on the sub-system best performing exposure model by using a plurality of machine learning techniques to ensemble a plurality of classification models, thereby resulting in a plurality of ensembling results and subsequently stacking the plurality of ensembling results in order to increase accuracy; and transmit the updated exposure meta-model to the at least one sub-system.

The at least one sub-system, in some embodiments, is communicatively coupled to and non-collocated with the meta-model system and includes a sub-system memory device comprising computer readable instructions and a sub-system processing device operatively coupled with the sub-system memory device for executing the computer readable instructions. This can cause the sub-system processing device to: receive the updated exposure meta-model transmitted from the meta-model system; access a sub-system exposure model comprising a real-time exposure detection and prevention engine and a interaction database comprising interaction exposure decision data and interaction exposure feedback data; and update the sub-system exposure model with the updated exposure meta-model transmitted from the meta-model system.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
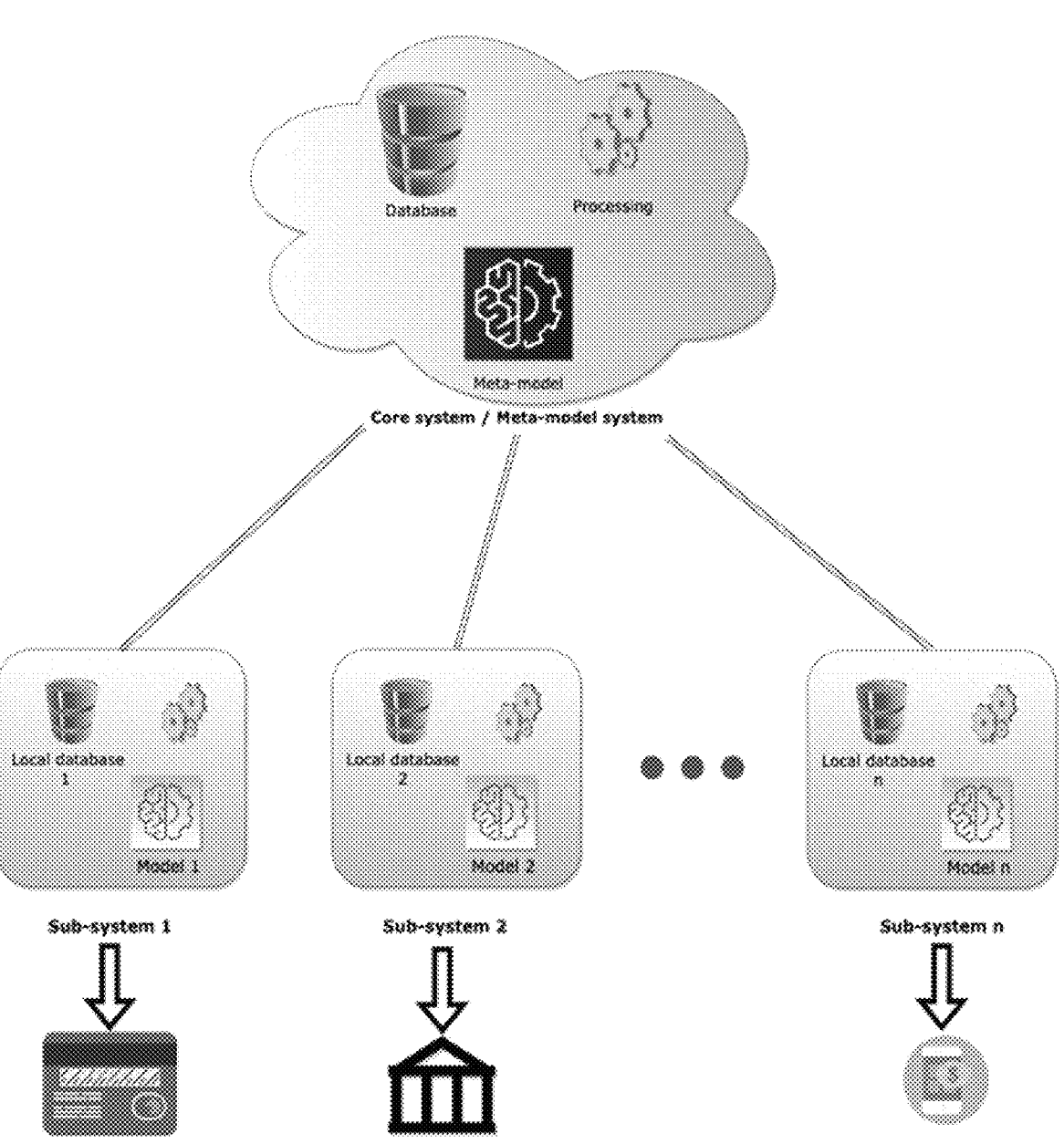

Having thus described embodiments of the invention in general terms, reference will now be made to the accompanying drawings, wherein:

FIG. 1 is a schematic diagram of the framework architecture of the fraud prevention and detection system, according to at least one embodiment, in the context of banking transactions.

Figure 2:
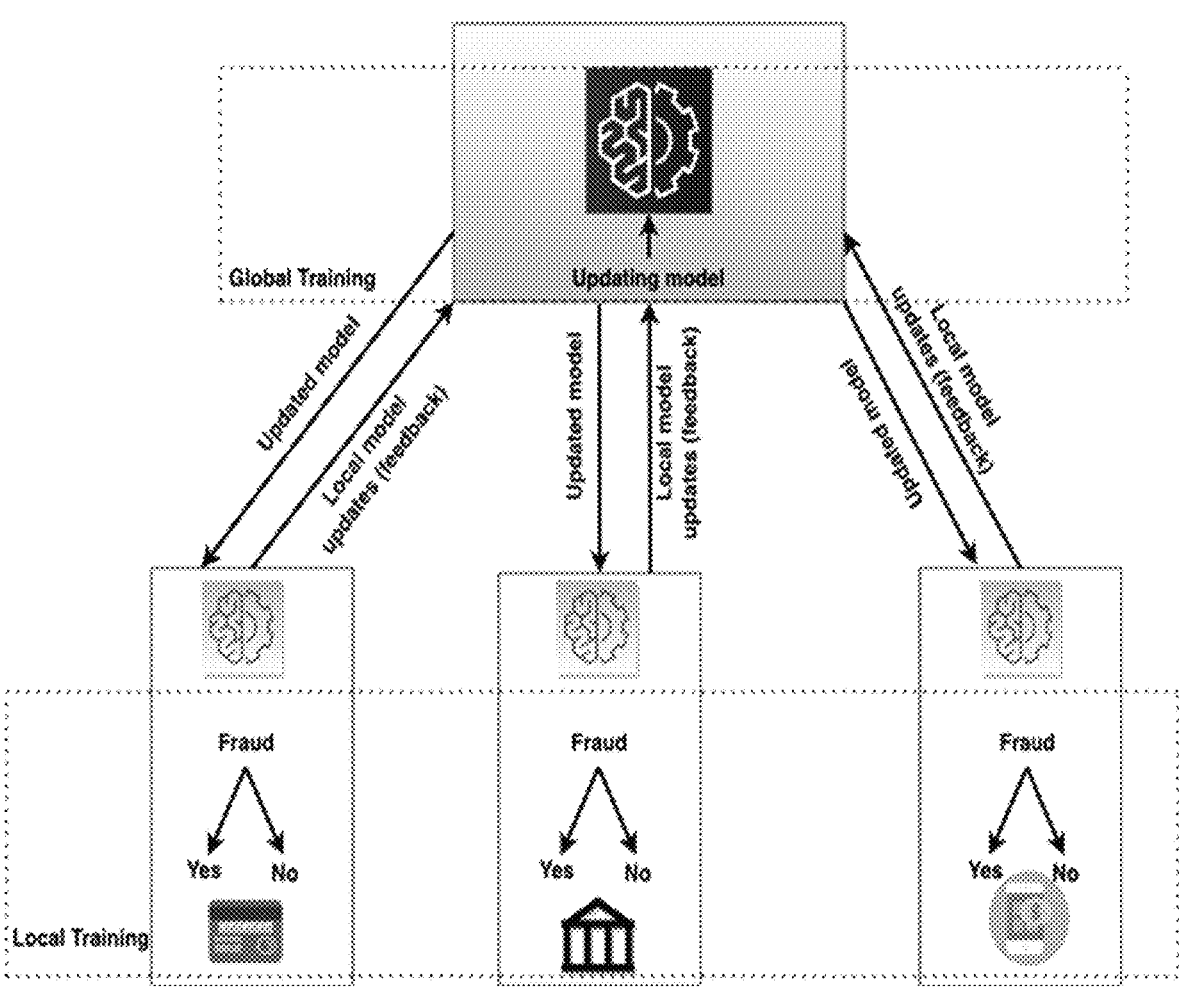

FIG. 2 schematic diagram of a global and local training of the fraud prevention and detection system, according to at least one embodiment, in the context of banking transactions.

Figure 4A:
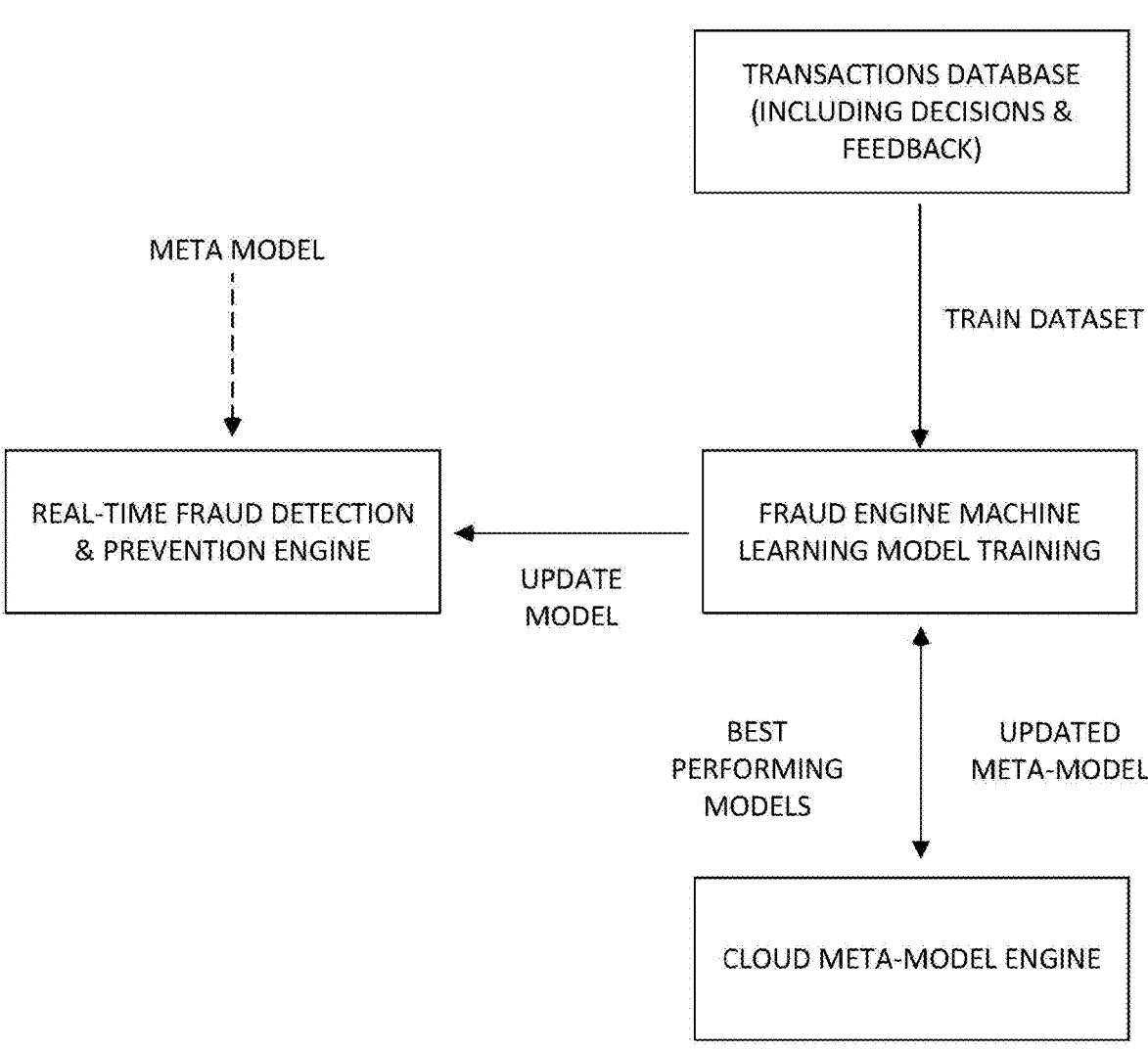
Figure 4B:
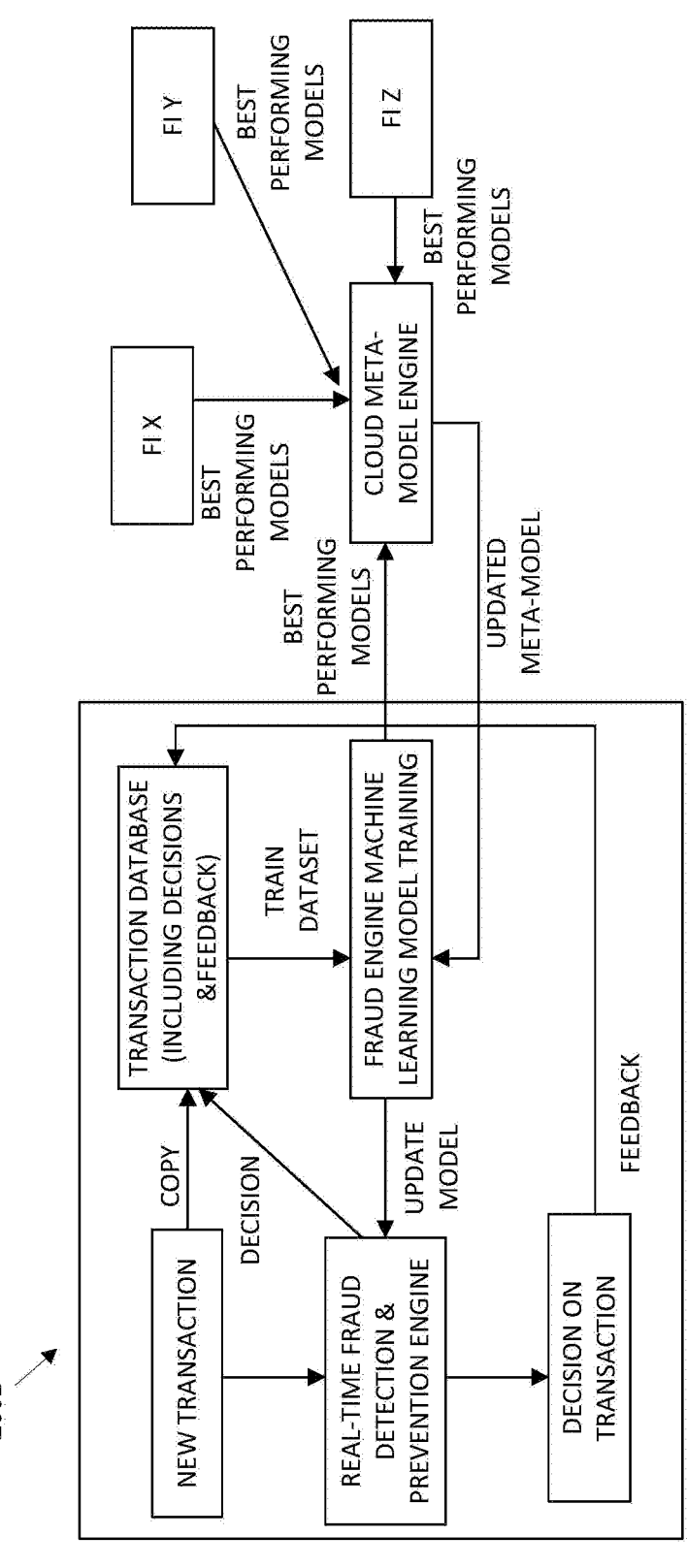

FIG. 3 illustrates an environment in which a meta-model system and sub-systems operate according to some embodiments of the present invention;

FIG. 4A is an illustration of a meta-model system and sub-systems operating in accordance with embodiments of the present invention;

FIG. 4B is an alternative illustration of the meta-model system and sub-systems operating in accordance with embodiments of the present invention;

FIG. 5A is a flowchart illustrating fraud detection and prevention methods according to some embodiments of the present invention;

FIG. 5B is another flowchart illustrating fraud detection and prevention methods according to some embodiments of the present invention; and FIG. 5C is another flowchart illustrating fraud detection and prevention methods according to some embodiments of the present invention.

Figure 6:
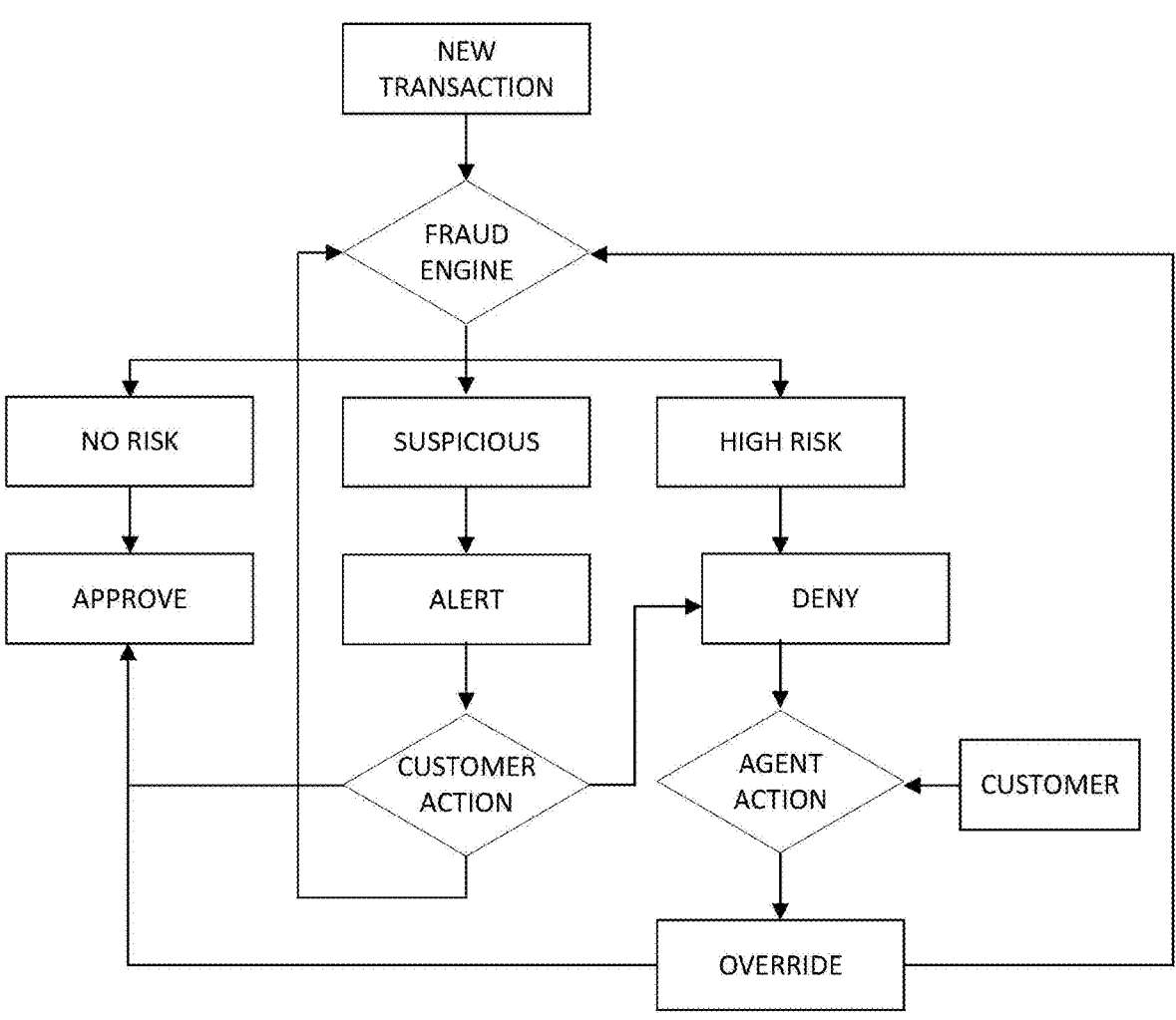

FIG. 6 is a flowchart by which the system renders decisions on how to handle new transactions, according to some embodiments of the present invention.

Figure 7:
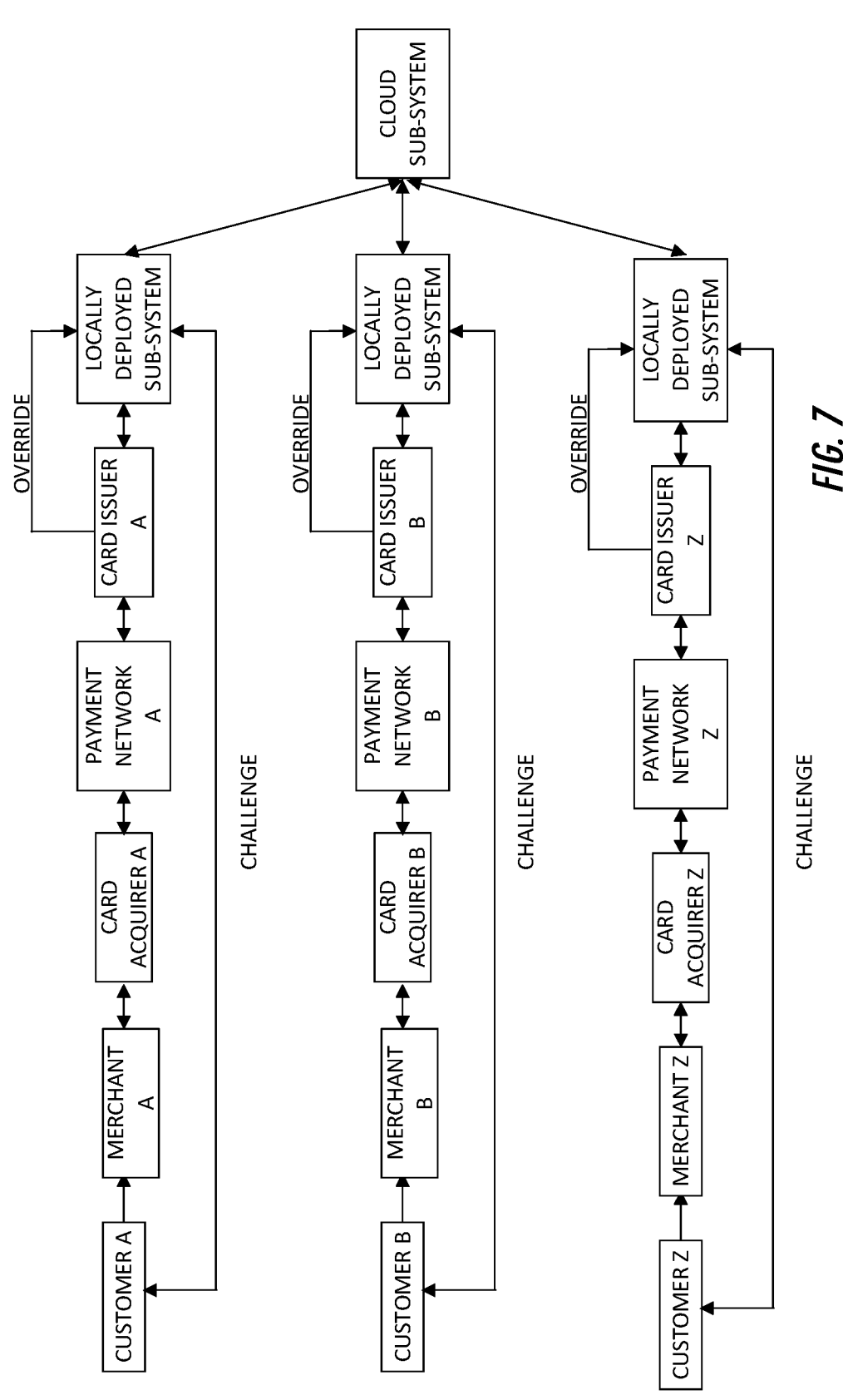

FIG. 7 is a flowchart showing multiple customer/merchant transactions and decisions being rendered thereon by respective local sub-systems, which contribute updated data to the cloud-system database, which accordingly feeds back the updated data to the sub-systems, according to some embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the present invention provide for a distributed adaptive learning transaction fraud detection and prevention system has a meta-model system that accesses a fraud meta-model comprising a real-time fraud detection and prevention engine and a transaction database comprising transaction fraud decision data and transaction fraud feedback data; receives from at least one sub-system a sub-system best performing fraud model; updates the fraud meta-model based at least in part on the sub-system best performing fraud model; and transmits the updated fraud meta-model to the at least one sub-system; and at least one sub-system receives the updated fraud meta-model transmitted from the meta-model system; accessing a sub-system fraud model comprising a real-time fraud detection and prevention engine and a transaction database comprising transaction fraud decision data and transaction fraud feedback data; and updates the sub-system fraud model with the updated fraud meta-model transmitted from the meta-model system.

Introduction—This text intends to provide the technical details from an Artificial Intelligence and Machine learning point of view of the distributed adaptive learning transaction fraud detection and prevention system. It consists of a real-time streaming card fraud detection and prevention system which is continuously self-learning and fine-tuning its models. This is based on an innovative approach toward machine learning model design and deployment architecture of the overall system. In a nutshell, the idea we will develop below is inspired by the concept of federated learning adapted to the context of fraud detection and prevention in banking transactions. This novel machine learning approach is deployed in each "sub-system" dedicated to the needs of each financial institution so as to process its customers' transactions privately, securely and in accordance with local (e.g. data sovereignty) and/or global regulations & standards (e.g. PCI). The best performing models from all deployed "sub-system" are aggregated anonymously in the cloud "core-system" which uses them in various machine learning techniques in succession in order to produce the most accurate model. This cloud "meta-model" is communicated back to each "sub-system" so as to share the aggregated knowledge around patterns, behaviors and events that have been flagged from the entire system are fraudulent to minimize the possibility for a local "zero-day" fraudulent event which is already known to the system.

The "meta-model", the cloud "core-system" and "sub-system(s)"—"Meta-model" refers to a global model, in several embodiments, that orchestrates the "sub-system(s)" models in order to decide if the transaction is fraudulent or not (binary classification task). This leads to the notion of the "meta-model system" being the core system which hosts the "meta-model" and communicates independently with each sub-system(s). A schematic illustration of this framework is shown in FIG. 1. In addition to containing the meta-model this core system also contains the necessary processes that allow the proper functioning of fraud detection and prevention in the context of a banking transaction.

Likewise, the sub-system(s) also host processes customized to the application of each sub-system(s) in order to streamline the input data of the models. Their main role is to receive the updated meta-model from the core system and apply it. After the fraud detection is performed by the sub-system, feedback on the quality of the meta-model fraud decision is sent back to the core-system. The core system will then update the meta-model according to this feedback.

Adaptive learning and ensemble modeling—Adaptive learning refers to the continuous improvement of the meta-model based on the different feedbacks provided by each sub-system(s). Finally, instead of a single fine-tuned model, our system is using various machine learning techniques (ensembling) in succession (stacking) in order to produce the most accurate predictions. Every improvement of the meta-model is done through a re-training procedure using ensemble machine learning techniques such as: 1) Stacking Modeling; 2) Boosting/Bagging; 3) Voting Classifier; 4) Hybrid Models.

These techniques continuously find the optimal combination of the meta-model parameters; it is a real-time adaptive model. Ensemble machine learning, also known as Ensemble learning, is a machine learning's paradigm consisting of combining several Machine Learning models, each of which aims to solve the same problem. In our case, it concerns the classification of banking transactions as fraudulent or not and this kind of classification is also called binary classification.

A Stacking Modeling entails, in some embodiments, the training of several models of different types in parallel and then the final model (the meta-model) will use the results of all these models to give the final prediction. The bagging and boosting modeling are relatively similar approaches as they both involve combining models but this time of the same nature (e.g. decision trees). The bagging modeling combines models using average or quantile strategies on the outputs of each model. Unlike boosting, which constructs models in a sequential manner, each model depends on the previous model's output. Voting Classifier, as its name suggests, uses a voting procedure on the outputs of the models to be combined. Models are not necessarily of the same nature and several voting rules can be implemented (usually majority rule voting). Hybrid modeling is a more "home-made" way to combine different models according to specific cases. In the present case, it is a rule based decision that will decide the right model according to the different context parameters of the transactions. All these approaches are designed to improve performance by using the advantages of the different models which on their own would be insufficient. More precisely the techniques used in the ensemble include many classification models such as Gradient Boosting, Random Forests, Isolation Forests alongside Multi-Layer Neural Networks and Genetic Algorithms. The results produced by each predictor as a single model are then to be fed to the next layer also consisting of other classifiers and networks. Each of these cascading layers decreases in size in order to reach the last stage/layer creating a "meta-model" which is producing the final prediction. All the aforementioned models are tuned and trained with subsets of features and a variety of hyper-parameters in order to produce meaningful but also diverse predictions for the given "sub-problem." This utilized in some embodiments of our application, which by nature is to detect rare events in the transactions.

In some embodiments, processes are continuously improved based on the feedback received by each local sub-system on a federated knowledge transfer basis, as well as the actions taken by the end-users and the experts' input.

The global training of the meta-model an local training of the sub-system(s) model(s) —The training the meta-model at the level of the core system, in some embodiments, refers to and can be termed global training. Local training refers to the model training for each sub-system(s). As detailed above, at the core-system stage the meta-model is constantly retrained after one or more models are triggered (in the sub-system(s)) with the arrival of new transactions. The direction of communication starts from the sub-systems and rises to the core system. In contrast to local training, which is performed in each subsystem following the information sent by the core system after the global training. Overall, global training is based on ensemble modeling techniques while local training is based on classical machine learning training methods allowing to find the best parameters to increase the accuracy of the model. The way in which the models are retrained is illustrated in FIG. 2. This paradigm of training algorithms across multiple sub-systems without exchanging data is also known as federated learning. This concept enables to tackle the following problem which is at the heart of our application: how can a model of a subsystem properly classify a fraud which appears for the first time while this fraud is already known in another subsystem? The answer is now clear, global training enables the pooling of the knowledge of all models located in different subsystems without the need to exchange private data.

This led to scalable adaptive learning fraud detection & prevention solution which is able to learn both from other financial institutions but also from the feedback provided by the customers and analysts that investigate the flagged fraudulent transactions so as to continuously optimize its engines, increase its detection rate and reduce the number of false positives.

Model validation, in some embodiments, is performed prior to the use of the model whereas model monitoring is performed in parallel in real time. The validation consists of setting up diverse scenarios for the use of the model in order to verify that the performance remains at the defined level. The main difficulty is the highly unbalanced data concerning fraud detection. It is advantageous in our case to use the right metric which in our case corresponds to fraud detection accuracy. In addition to the classical techniques used such as the separation of the dataset into training and test datasets or cross validation methods (stratified, k-fold) we implemented methods adapted to the reality of unbalanced datasets like synthetic data creation. It is important to ensure that our models perform well in detecting both fraudulent and nonfraudulent transactions. This is why we focus on the F1 macro score which is the most rigorous. The macro F1-score shows that the model is able to adapt to the imbalance of the dataset. It represents the unweighted average performance per class. This metric will ensure that we do not ignore the under-represented class, which here is fraudulent transactions.

When the meta-model is shared back with the local sub-systems it is assessed based on the validation technique described above and based on its performance against the current it is either upvoted (accepted) or downvoted (rejected). This process allows the local sub-systems to always have the best performing models and the feedback from each local sub-system enables the meta-model to develop a zero knowledge trust feedback loop for continuous optimization.

The cold-start issue, i.e. how the meta-model and subsystem(s) model(s) will react when launched in a new environment, is a key topic in the good functioning of the fraud detection and prevention system. It can be beneficial that a fraudulent transaction is not classified as a nonfraudulent transaction. It is advantageous, at the time of system launch in a new environment, to have a stricter model and give false positives (non-fraudulent transactions classified as fraudulent) than the opposite (i.e. false negatives). For this purpose we access the classification probabilities and we can set an adaptive threshold allowing the control on the balance between false negatives and false positives. Nevertheless, it is interesting to point out that the initial meta-model implemented in the core system is already pre-trained to detect fraudulent transactions with a decent accuracy. In the end, the cold start issue is manageable because of our knowledge of the financial sector and our research on the constitution of a real-life training database.

In each new sub-system that is joining the federated network the meta-model is implemented in learning mode without affecting the transactions (taking action). As transactions are assessed and tagged by the local sub-system based on the meta-model the local model is adjusted based on the behavior of the local transactions so as to be turned into operational mode.

Such exchange of knowledge through the federated knowledge achieved by the meta-model allows each local sub-system to identify abnormal and suspicious behaviors that had never been seen before based on the learnings from other sub-systems that have already identified such behaviors. This allows financial institutions to shorten the time between identifying and preventing new types of fraud within their card population based on the experience of other participating financial institutions of different size and different geographies.

To summarize, the fraud detection model process can be illustrated by a host system that contains the final meta-model, which alone has the ability to communicate with each sub-systems and its role is to collect feedback from the application of the model for each sub-system in order to enhance the performance of the final meta-model. However, it is important to specify that the sub-systems do not interact with each other, their only point of contact is the core-system. The information that passes between the sub-system and the core-system is the feedback and the decision that allows the meta-model to be updated and not the transactions themselves. Indeed, the transactions are stored in a database in each sub-system. This allows the data privacy of each sub-system to be respected while pooling the experience acquired by each transaction.

Regarding the interaction between the core system and a sub-system (or several sub-systems), the meta-model system (aka core system) has complete access to the meta-model and the database of transactions and their associated decisions as well as feedback stored in the core-system, and receives the most performing model(s) of the subsystem(s) and the associated feedback. The meta-model is updated using the most performing model(s) of the subsystem(s) and the associated feedback, using the machine learning techniques outlined above (ensemble, modeling, stacking model, and voting classifier. The updated meta-model is then transmitted to the sub-system(s) to ensure that the most efficient model is available.

The sub-system(s) receives the most performing meta-model from the core-system, and has access only to the sub-system database of transactions and their associated decisions as well as feedback but also has access to the real time fraud detection procedure (in place in the relevant sub-system(s)). It replaces the sub-system fraud detection model with the updated meta-model received from the core-system.

Regarding the functioning of the procedure described above, when a new transaction is received for analysis (at least one sub-system is implemented), the sub-system(s) receive the new transaction data. The meta-model saved in this sub-system is triggered on the fly to detect whether the transaction data is fraudulent or not, leading to a new transaction fraud decision. This decision is then stored together with the feedback in the database of the core-system (the transaction is not communicated to the core system).

Regarding re-training and updating of the meta-model within the core system (with at least one sub-system is implemented). The re-training of the model is achieved through the integration of decisions and feedback received from the sub-systems, as already stated this is carried out through machine learning techniques, it results in an updated meta-model and new trained transaction data (labeled transactions and feedbacks). The meta-model is updated in real time due to the new transactions that are trained.

Regarding the methodology used to improve the meta-model (with at least one sub-system is implemented), a mechanism is implemented in the sub-system allowing the monitoring and the selection of the best model, this selection is made using a analysis of metrics adapted to fraud detection for the identification of the most accurate fraud model. The most efficient model is transmitted to update the core system meta-model.

The final meta-model is derived from a number of ensemble modelings that are aggregated in order to obtain most accurate results. The different classification models employed in the main procedure are Gradient Boosting model, Random Forest model, Isolation Forest model and the combination of Isolation Forest with a multi-layer neural network model, and/or Isolation Forest model combined with Genetic algorithm.

Within the context discussed above and referring to FIGS. 4A and 4B, embodiments of the invention provide a novel self-learning card fraud detection solution that can increase accuracy, reduce false positives, and enhance consumers experience while transacting with their cards.

For infrastructure classification, the system utilizes model ensembles and stacked models. Instead of a single fine-tuned model, embodiments of the invention system use various machine learning techniques (ensembling) in succession (stacking) in order to produce the most accurate predictions. The techniques used in the ensemble include many classification models such as Gradient Boosting, Random Forests, Isolation Forests alongside Multi-Layer Neural Networks and Genetic Algorithms. The results produced by each predictor as a single model are then to be fed to the next layer also consisting of other classifiers and networks. Each of these cascading layers is decrease in size in order to reach the last stage/layer creating a "meta-model" which is producing the final prediction. All the aforementioned models are tuned and trained with subsets of features and a variety of hyper-parameters in order to produce meaningful but also diverse predictions for the given "sub-problem".

This novel machine learning approach is deployed in each "sub-system" dedicated to the needs of each financial institution, line of business, or other node in a distributed network, so as to process the node's customers' transactions privately, securely & in accordance to local (e.g. data sovereignty) and/or global regulations & standards (e.g. PCI). The best performing models from all deployed sub-system are aggregated anonymously in the distributed network of, typically cloud-based sub-systems, which uses them in various machine learning techniques in succession in order to produce the most accurate model. This cloud "meta-model" is communicated back to each sub-system so as to share the aggregated knowledge around patterns, behaviors & events that have been flagged from the entire system are fraudulent to minimize the possibility for a local "zero-day" fraudulent event which is already known to the system.

The above system structure therefore provides a scalable adaptive learning fraud detection & prevention solution which is able to learn both from other nodes (i.e., financial institutions) but also from the feedback provided by the customers & analysts that investigate the flagged fraudulent transactions so as to continuously optimize its engines, increase its detection rate and reduce the number of false positives.

Today most card issuers and card processors rely on rules to make decisions on whether a transaction is fraudulent or not. These rules even if they are not manually defined; but rather based on machine learning and/or AI are still usually based on trained datasets derived from the company that runs the system. Embodiments of the invention system are able to continuously learn based on the decisions made by a plurality of models generated by a plurality of companies shared anonymized with our cloud system. In such a case the fraudulent patterns defined in one company are automatically shared with all, minimizing the possibility for a new fraud pattern to catch off guard the companies utilizing our system. At the same time transactions that are flagged as suspicious or miss-flagged as fraudulent and cleared are retraining the local models that are then communicated with the cloud meta-models to enable all deployments to avoid such false positives. This breakthrough leverages cloud technologies, advancements on machine learning and distributed systems allowing companies to reduce fraud rate without impacting consumer satisfaction. Some of the benefits the invention provides are reducing cancelled or terminated non-fraudulent transactions by increasing fraud detection accuracy and true fraud cancellation. The system enables specific nodes to leverage the benefits of a collectively learned and honed detection and mitigation system without being required to expend great resources only to achieve less than ideal fraud detection and mitigation results.

Specific important aspects of embodiments of the system include that each card issuer or card processor deploys the system on-premises, leveraging a dedicated cloud, a hybrid cloud or public cloud. The local system is trained based on the profile of the card issuer or card processor customers in conjunction with the cloud "meta-models". Each transaction reaching the card issuer or card processor is transmitted by an API call to the system for near instantaneous review. The system leverages fast performing machine learning techniques to identify the likelihood of the transaction to be fraudulent or not. Each transaction might be flagged based on a score as follows, "no risk," "suspicious," or "high risk." A flowchart by which the system renders decisions on how to handle new transactions is shown in FIG. 6.

A new transaction is processed by the fraud engine, and the transaction is flagged. For "no risk," the system approves the transaction and/or sends instructions to the system(s) processing the transaction to approve the transaction. For "suspicious," the system triggers a customer transaction verification process, which will confirm or deny the legitimacy of the transaction. For "high risk," the system declines the transaction and/or sends instructions to the system(s) processing the transaction to deny the transaction. In some cases, a transaction may be falsely denied and an agent might override the rejection following an inquiry by the specific customer or any other reason that might lead to a review.

The feedback from each transaction is utilized to optimize the locally deployed decision models leading to best performing meta-models. The best performing models per deployment will be communicated to the cloud "meta-model" anonymized to protect both the privacy of the customers and the reputation of each card issuer & card processor. These best performing models will be used in various machine learning techniques in succession in order to produce the most accurate models. These cloud-based or sub-system stored "meta-models" are then communicated to all deployments so as to continuously optimize each of the sub-systems of the overall system and its engines, increase fraud detection rate across the entire system, and reduce the number of false positives across the entire system. This process continues in real-time for as long as there are new transactions.

Referring to FIG. 3, an environment 1 in which embodiments of the invention operate is illustrated, in at least one embodiment. Environment 1 includes a user computer system 160 associated or used with authorization of a user 2 (e.g., an administrator of the meta-model system or a sub-system, or the like), a meta-model system 110, a number of sub-systems 120, which each communicate over a network 102 with the meta-model system 110, and other payment processing systems (i.e., payment processing "rails") 150. In some embodiments, the other payment processing systems 150 may be or include systems corresponding to one or more third party financial institutions (e.g., a partner, agent, or contractor associated with a financial institution, a credit bureau, third party banks, and so forth).

The systems and devices communicate with one another over the network 102 and perform one or more of the various steps and/or methods according to embodiments of the disclosure discussed herein. The network 102 may include a local area network (LAN), a wide area network (WAN), and/or a global area network (GAN). The network 102 may provide for wireline, wireless, or a combination of wireline and wireless communication between devices in the network. In one embodiment, the network 102 includes the Internet.

The meta-model system 110, the sub-system(s) 120, the other payment processing systems 150, and/or the user computer systems 160 each includes a computer system, server, multiple computer systems and/or servers or the like. The sub-system 120, in the embodiments shown has a communication device 142 communicably coupled with a processing device 144, which is also communicably coupled with a memory device 146. The processing device 144 is configured to control the communication device 142 such that the sub-system 120 communicates across the network 102 with the meta-model system 110 and/or other systems (but typically not the other sub-systems directly). The processing device 144 is also configured to access the memory device 146 in order to read the computer readable instructions 148, which in some embodiments includes the sub-system model 147 discussed herein. The memory device 146 also includes a data store 148 or database for storing pieces of data that can be accessed by the processing device 144. In some embodiments, the data store 148 includes a transaction database unique to that particular sub-system.

The meta-model system 110, in the embodiments shown has a communication device 112 communicably coupled with a processing device 114, which is also communicably coupled with a memory device 116. The processing device 114 is configured to control the communication device 112 such that the meta-model system 110 communicates across the network 102 with the sub-systems 120 and/or other systems. The processing device 114 is also configured to access the memory device 116 in order to read the computer readable instructions 118, which in some embodiments includes the meta-model 117 or meta-model engine or real-time fraud detection and prevention engine discussed herein. The memory device 116 also includes a data store 119 or database for storing pieces of data that can be accessed by the processing device 114.

The user computer system 160 has a communication device 162 communicably coupled with a processing device 164, which is also communicably coupled with a memory device 166. The processing device 164 is configured to control the communication device 162 such that the user computer system 160 communicates across the network 102 with the meta-model system 110 and/or the sub-systems 120 and/or other systems. The processing device 164 is also configured to access the memory device 166 in order to read the computer readable instructions 168, which in some embodiments includes an application, web-browser or other portal to access the meta-model of the meta-model system 110 or otherwise communicate with other systems in the environment. The memory device 166 also includes a data store 169 or database for storing pieces of data that can be accessed by the processing device 164.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 114, 144, and 164 may further include functionality to operate one or more software programs based on computer-executable program code thereof, which may be stored in a memory. As the phrase is used herein, a processing device 114, 144, and 164 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 116 includes any computer memory that provides an actual or virtual space to temporarily or permanently store data and/or commands provided to the processing device 114 when it carries out its functions described herein.

Applications (not shown), the meta-model 117, the sub-system model 147, and/or application 167 are for instructing the processing devices to perform various steps of the methods discussed herein, and/or other steps and/or similar steps. In various embodiments, one or more of the applications are included in the computer readable instructions stored in a memory device of one or more systems or devices other than the systems. For example, in some embodiments, the application is stored and configured for being accessed by a processing device of one or more third party systems connected to the network. In various embodiments, the applications stored and executed by different systems/devices are different. In some embodiments, the applications stored and executed by different systems may be similar and may be configured to communicate with one another, and in some embodiments, the applications may be considered to be working together as a singular application despite being stored and executed on different systems.

In various embodiments, one of the systems discussed above, such as the sub-system 120, is more than one system and the various components of the system are not collocated, and in various embodiments, there are multiple components performing the functions indicated herein as a single device. For example, in one embodiment, multiple processing devices perform the functions of the processing device 144 described herein. In various embodiments, the sub-system 120 includes one or more of the other systems and/or any other system or component used in conjunction with or to perform any of the method steps discussed herein. For example, the sub-system 120 may include a user computer system.

In various embodiments, the one or more of the systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 300, the other methods discussed below, or other methods, processes or steps discussed herein or not discussed herein.

Referring now to FIGS. 5A, 5B, and 5C, methods 300A, 300B, and 300C are illustrated for distributed adaptive learning transaction fraud detection and prevention. Method 300A includes, as represented by block 310, accessing, by a meta-model system, a fraud meta-model comprising a real-time fraud detection and prevention engine and a transaction database. The transaction database may include transaction fraud decision data and transaction fraud feedback data.

Next, as represented by block 312, the meta-model system receives from a sub-system the best performing fraud model. Then, as represented by block 314, the meta-model system updates the fraud meta-model based at least in part on the sub-system best performing fraud model. Then, as represented by block 316, the meta-model system transmits the updated fraud meta-model to the sub-system.

Method 300B illustrates steps performed by the sub-system. First, as represented by block 320, the sub-system receives the updated fraud meta-model transmitted from the meta-model system. Next, as represented by block 322, the sub-system accesses a sub-system fraud model comprising a real-time fraud detection and prevention engine and a transaction database comprising transaction fraud decision data and transaction fraud feedback data. Finally, as represented by block 324, the sub-system updates the sub-system model with the updated fraud meta-model transmitted from the meta-model system.

Referring now to FIG. 5C, method 300C illustrates additional steps according to embodiments. First, represented by block 330, the sub-system receives new transaction data and applies the real-time fraud detection and prevention engine to the new transaction data. Next, as represented by block 332, the sub-system transmits the new transaction fraud decision to the transaction database and communicates the new transaction fraud feedback data to the transaction database. Then, represented by block 334, the sub-system trains the transaction fraud decision data and transaction fraud feedback data of the transaction database using a plurality of machine learning techniques, such as ensembling a plurality of classification models, thereby resulting in a plurality of ensembling results. The system subsequently stacks the plurality of ensembling results in order to increase accuracy. The plurality of classification models comprises at least one selected from the group consisting of a gradient boosting model, a random forest model, an isolation forest model, an isolation forest model alongside a multi-layer neural network model, and/or an isolation forest model alongside a genetic algorithm.

Next, the sub-system, as represented by block 336, updates the real-time fraud detection and prevention engine based on the trained data. Finally, the sub-system identifies the best performing fraud model and transmits it to the meta-model system, as represented by block 338.

In accordance with the invention, the processes discussed above can be repeated indefinitely for each and every transaction processed by each of the nodes or financial institutions administering the sub-systems. In this regard, not only is each individual sub-system model updated and improved upon, but the overall system's meta-model engine is constantly updated and improved-upon in real-time or near real-time.

Embodiments of the present invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

The above-described and/or implied systems and methods in implementation provide positive impact both to the reputation and the bottom line of financial institutions since consumers do not like their transactions to be declined or being victims of fraud. Operational efficiencies are provided, including the reduction of human effort in identifying fraud, and the speed and accuracy of fraud detection. This reduces communication time for service entities and their customers, thus reducing network traffic in voice, data, and internet connections. Thus latencies are reduced across networks, energy is conserved, and networks and computing devices are improved by the streamline approaches described above.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method of training a machine-learning (ML) algorithm to detect and prevent exposure, the algorithm trained by a meta-model system comprising a memory device, the memory device comprising computer readable instructions and a processing device operatively coupled with the memory device for executing the computer readable instructions to cause the processing device to:

(i) access from the memory device an exposure meta-model comprising a real-time exposure detection and prevention engine and an interaction database comprising interaction exposure decision data and interaction exposure feedback data;

(ii) receive from at least one sub-system a sub-system best performing exposure model;

(iii) update the exposure meta-model in response to feedback data via a feedback loop from the at least one sub-system that is non-collocated with the meta-model system associated with the exposure meta-model transmitting its best performing exposure model trained on local transaction data to the meta-model system, and by using a plurality of machine learning techniques to ensemble a plurality of classification models, thereby resulting in a plurality of ensembling results and subsequently stacking the plurality of ensembling results in order to increase accuracy; and (iv) transmit the updated exposure meta-model to the at least one sub-system, wherein the at least one sub-system is communicatively coupled to and non-collocated with the meta-model system and comprises a sub-system memory device comprising computer readable instructions and a sub-system processing device operatively coupled with the sub-system memory device for executing the computer readable instructions to cause the sub-system processing device to:

(i) receive the updated exposure meta-model transmitted from the meta-model system;

(ii) access a sub-system exposure model comprising a real-time exposure detection and prevention engine and a interaction database comprising interaction exposure decision data and interaction exposure feedback data; and (iii) update, in real-time, the sub-system exposure model with the updated exposure meta-model transmitted from the meta-model system.

2. The method of claim 1, further comprising:

(a) receiving, by the at least one sub-system, new transaction data;

(b) applying, by the at least one sub-system, the real-time exposure detection and prevention engine to the new interaction data, thereby resulting in a new interaction exposure decision;

(c) communicating, by the at least one sub-system, the new interaction exposure decision to the interaction database; and (d) communicating, by the at least one sub-system, new interaction exposure feedback data to the interaction database.

3. The method of claim 2, further comprising:

(e) training, by the at least one sub-system, the interaction exposure decision data and interaction exposure feedback data of the interaction database using a plurality of machine learning techniques, thereby resulting in trained data; and (f) updating, by the at least one sub-system, the real-time exposure detection and prevention engine based at least in part on the trained data.

4. The method of claim 3, further comprising:

(g) identifying, by the at least one sub-system, a best performing exposure model; and (h) transmitting, by the at least one sub-system, the best performing exposure model to the meta-model system.

5. The method of claim 1, wherein using the plurality of machine learning techniques comprises ensembling a plurality of classification models, thereby resulting in a plurality of ensembling results and subsequently stacking the plurality of ensembling results in order to increase accuracy.

6. The method of claim 5, wherein the plurality of classification models comprises at least one selected from the group consisting of a gradient boosting model, a random forest model, an isolation forest model, an isolation forest model alongside a multi-layer neural network model, and/or an isolation forest model alongside a genetic algorithm.

7. A distributed adaptive learning transaction fraud detection and prevention system comprising:

(a) a meta-model system comprising a memory device comprising computer readable instructions and a processing device operatively coupled with the memory device for executing the computer readable instructions to cause the processing device to:

access from the memory device a fraud meta-model comprising a real-time fraud detection and prevention engine and a transaction database comprising transaction fraud decision data and transaction fraud feedback data;

receive from at least one sub-system a sub-system best performing fraud model;

update the fraud meta-model in response to feedback data via a feedback loop from the at least one sub-system that is non-collocated with the meta-model system associated with the fraud meta-model transmitting its best performing exposure model trained on local transaction data to the meta-model system; and transmit the updated fraud meta-model to the at least one sub-system; and (b) at least one sub-system communicatively coupled and non-collocated with the meta-model system comprising a memory device comprising computer readable instructions and a processing device operatively coupled with the memory device for executing the computer readable instructions to cause the processing device to:

(i) receive the updated fraud meta-model transmitted from the meta-model system;

(ii) access a sub-system fraud model comprising a real-time fraud detection and prevention engine and a transaction database comprising transaction fraud decision data and transaction fraud feedback data; and (iii) update, in real-time, the sub-system fraud model with the updated fraud meta-model transmitted from the meta-model system.

8. The system of claim 7, wherein the at least one sub-system has a processing device for executing the computer readable instructions further to cause the processing device to:

(a) receive new transaction data;

(b) apply the real-time fraud detection and prevention engine to the new transaction data, thereby resulting in a new transaction fraud decision;

(c) communicate the new transaction fraud decision to the transaction database; and (d) communicate new transaction fraud feedback data to the transaction database.

9. The system of claim 8, wherein the at least one sub-system has a processing device for executing the computer readable instructions further to cause the processing device to:

(a) train the transaction fraud decision data and transaction fraud feedback data of the transaction database using a plurality of machine learning techniques, thereby resulting in trained data; and (b) update the real-time fraud detection and prevention engine based at least in part on the trained data.

10. The system of claim 9, wherein the at least one sub-system has a processing device for executing the computer readable instructions further to cause the processing device to:

(a) identify a best performing fraud model; and (b) transmit the best performing fraud model to the meta-model system.

11. The system of claim 7, wherein using the plurality of machine learning techniques comprises ensembling a plurality of classification models, thereby resulting in a plurality of ensembling results and subsequently stacking the plurality of ensembling results in order to increase accuracy.

12. The system of claim 11, wherein the plurality of classification models comprises at least one selected from the group consisting of a gradient boosting model, a random forest model, an isolation forest model, an isolation forest model alongside a multi-layer neural network model, and/or an isolation forest model alongside a genetic algorithm.

13. A method for distributed adaptive learning transaction fraud detection and prevention using a meta-model system comprising a memory device comprising computer readable instructions and a processing device operatively coupled with the memory device for executing the computer readable instructions to cause the processing device to perform a set of actions and a sub-system operatively coupled with the meta-model system comprising a memory device comprising computer readable instructions and a processing device operatively coupled with the memory device for executing the computer readable instructions to cause the processing device to perform a second set of actions, the method comprising:

(a) accessing, by the meta-model system from the memory device, a fraud meta-model comprising a real-time fraud detection and prevention engine and a transaction database comprising transaction fraud decision data and transaction fraud feedback data;

(b) receiving, by the meta-model system and from at least one sub-system, a sub-system best performing fraud model;

(c) updating, by the meta-model system, the fraud meta-model in response to feedback data via a feedback loop from the at least one sub-system that is non-collocated with the meta-model system associated with the fraud meta-model transmitting its best performing exposure model trained on local transaction data to the meta-model system;

(d) transmitting, by the meta-model system, the updated fraud meta-model to the at least one sub-system;

(e) receiving, by the at least one sub-system, the updated fraud meta-model transmitted from the meta-model system;

(f) accessing, by the at least one sub-system, a sub-system fraud model comprising a real-time fraud detection and prevention engine and a transaction database comprising transaction fraud decision data and transaction fraud feedback data; and (g) updating, by the at least one sub-system in real-time, the sub-system fraud model with the updated fraud meta-model transmitted from the meta-model system.

14. The method of claim 13, further comprising:

(i) receiving, by the at least one sub-system, new transaction data;

(j) applying, by the at least one sub-system, the real-time fraud detection and prevention engine to the new transaction data, thereby resulting in a new transaction fraud decision;

(k) communicating, by the at least one sub-system, the new transaction fraud decision to the transaction database; and (l) communicating, by the at least one sub-system, new transaction fraud feedback data to the transaction database.

15. The method of claim 14, further comprising:

(m) training, by the at least one sub-system, the transaction fraud decision data and transaction fraud feedback data of the transaction database using a plurality of machine learning techniques, thereby resulting in trained data; and (n) updating, by the at least one sub-system, the real-time fraud detection and prevention engine based at least in part on the trained data.

16. The method of claim 15, further comprising:

(o) identifying, by the at least one sub-system, a best performing fraud model; and (p) transmitting, by the at least one sub-system, the best performing fraud model to the meta-model system.

17. The method of claim 13, wherein using the plurality of machine learning techniques comprises ensembling a plurality of classification models, thereby resulting in a plurality of ensembling results and subsequently stacking the plurality of ensembling results in order to increase accuracy.

18. The method of claim 17, wherein the plurality of classification models comprises at least one selected from the group consisting of a gradient boosting model, a random forest model, an isolation forest model, an isolation forest model alongside a multi-layer neural network model, and/or an isolation forest model alongside a genetic algorithm.

* * * * *